United States Patent
Katoh

(10) Patent No.: US 8,648,826 B2
(45) Date of Patent: Feb. 11, 2014

(54) DISPLAY DEVICE

(75) Inventor: Satoshi Katoh, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 20 days.

(21) Appl. No.: 13/264,486

(22) PCT Filed: Apr. 14, 2010

(86) PCT No.: PCT/JP2010/056647
§ 371 (c)(1),
(2), (4) Date: Nov. 3, 2011

(87) PCT Pub. No.: WO2010/119882
PCT Pub. Date: Oct. 21, 2010

(65) Prior Publication Data
US 2012/0062492 A1    Mar. 15, 2012

(30) Foreign Application Priority Data

Apr. 17, 2009   (JP) ................................. 2009-100659

(51) Int. Cl.
*G09G 3/36*   (2006.01)
(52) U.S. Cl.
USPC ........................................... 345/173; 345/87
(58) Field of Classification Search
USPC .......... 345/173, 174, 175; 349/58, 59, 60, 61, 349/65, 67
See application file for complete search history.

(56) References Cited

U.S. PATENT DOCUMENTS

| | | | |
|---|---|---|---|
| 7,483,696 B1 * | 1/2009 | Mitchell | 455/431 |
| 8,037,500 B2 * | 10/2011 | Margis et al. | 725/75 |
| 8,089,576 B2 * | 1/2012 | Park | 349/58 |
| 8,184,228 B2 * | 5/2012 | Han et al. | 349/58 |
| 2005/0030728 A1 | 2/2005 | Kawashima et al. | |
| 2006/0038933 A1 | 2/2006 | Hashimoto | |
| 2007/0040816 A1 | 2/2007 | Toyomaki | |

FOREIGN PATENT DOCUMENTS

| | | |
|---|---|---|
| JP | 10-073805 A | 3/1998 |
| JP | 2006-058637 A | 3/2006 |
| JP | 2007-052183 A | 3/2007 |
| JP | 2008-151898 A | 7/2008 |
| WO | 03/040906 A1 | 5/2003 |

OTHER PUBLICATIONS

Official Communication issued in International Patent Application No. PCT/JP2010/056647, mailed on Jun. 8, 2010.

* cited by examiner

*Primary Examiner* — Kent Chang
*Assistant Examiner* — Nelson Rosario
(74) *Attorney, Agent, or Firm* — Keating & Bennett, LLP

(57) ABSTRACT

Provided is a display device with a narrowed frame capable of preventing pooling. A display device includes a display unit (69) including a liquid-crystal display panel (59), an internal frame (FM) covered with the liquid-crystal display panel (59), and a rear case (CS1) accommodating the internal frame (FM). Ribs (RB) of the rear case (CS1) support a touch panel (79) while separating the touch panel (79) from the internal frame (FM).

1 Claim, 11 Drawing Sheets

DISPLAY DEVICE

TECHNICAL FIELD

The present invention is related to a display device incorporating a touch panel.

BACKGROUND ART

These days, many liquid crystal display devices incorporate a touch panel. For example, the touch panel, which is operable intuitively, is often adopted in liquid crystal display devices incorporated in devices such as a navigation system provided in vehicles.

However, liquid crystal display devices (display devices) incorporating a touch panel suffer problems attributable to touch input. The problems will be described by using a liquid crystal display device 189 shown in FIGS. 5 to 9 (here, FIGS. 6 and 7 are sectional views taken along lines a-a' and b-b', respectively, in FIG. 5, and viewed from a direction indicated by arrows in FIG. 5; any member indicated without hatching is shown in side view).

As shown in FIGS. 5 to 7, in the liquid crystal display device 189, a liquid crystal display panel (a display panel) 159 and a backlight unit 149 are accommodated in a box-shaped rear case cs1, and a picture-frame shaped front case cs2 is placed over the liquid crystal display panel 159 accommodated in the rear case cs1. With the two cases cs1 and cs2 fixed to each other, the liquid crystal display panel 159 and the backlight unit 149 are supported between the two cases (herein, the liquid crystal display panel 159, the backlight unit 149, and the two cases cs1 and cs2 holding the liquid crystal display panel 159 and the backlight unit 149 therebetween will together be referred to as a display unit 169). Further, a touch panel 179 is placed over the front case cs2 via a picture-frame shaped cushion sheet 171.

With this arrangement, various problems arise when touch input is performed on the touch panel 179 and thus pressure is applied thereto as shown in FIGS. 8 and 9 which are enlarged sectional views corresponding to FIGS. 6 and 7, respectively. Such problems are caused by transmission of the pressure applied to the touch panel 179, as shown in FIG. 8, to the cushion sheet 171, then to the front case cs2, and further to an internal frame (a frame) fm which serves as the framework of the backlight unit 149.

If pressure is applied to the internal frame fm in this way, the pressure causes partial distortion of the internal frame fm. This results in a phenomenon (pooling phenomenon) in which a display surface of the liquid crystal display panel 159 attached to a support surface fmu of the internal frame fm via a double-stick tape (unillustrated) is adversely affected by the distortion of the internal frame fm and becomes wavy (here, the position of the liquid crystal display panel 159 is regulated by a positioning member fmt which protrudes from the support surface fmu; see FIG. 6). If the pooling phenomenon occurs in this way, it degrades the quality of images displayed on the liquid crystal display device 189.

Further, as shown in FIG. 9, the pressure applied to the touch panel 179 may be transmitted excessively to the front case cs2 via the cushion sheet 171.

Such excessive application of pressure to the front case cs2 makes part of the inner circumference of the picture-frame shaped front case cs2 come into contact with the liquid crystal display panel 159, and this includes the pooling phenomenon in the liquid crystal display panel 159.

A possible solution to the pooling phenomenon described above is, as shown in FIG. 10, to increase the rigidity of the front case cs2 by, for example, increasing a thickness t of the front case cs2 or increasing a width w of one side of the frame. This makes the front case cs2 less likely to warp even when excessive pressure is applied to the front case cs2.

Another possible solution is, as disclosed in Patent Literature 1, to adopt a comparatively large-sized case cs to support the touch panel 179 and to couple the touch panel 179 to the liquid crystal display panel 159 via an adhesive layer 191. With this structure, the case cs is prevented from warping, and furthermore, since the liquid crystal display panel 159 is out of contact with the case cs, the pooling phenomenon attributable to the case cs is less likely to occur in the liquid crystal display panel 159.

CITATION LIST

Patent Literature

Patent Literature 1: JP-A-H10-73805

SUMMARY OF INVENTION

Technical Problem

However, with the liquid crystal display device 189 as shown in FIGS. 10 and 11, side portions of the case cs located along the periphery of the liquid crystal display panel 159 tend to be wide, which prevents achievement of so-called narrowing of frame (see w in FIG. 10).

Also, in FIG. 11, the touch surface of the touch panel 179 and the display surface of the liquid crystal display panel 159 are connected to each other via the adhesive layer 191. Thus, if the touch panel 179 is made to warp by touch input performed thereon, the display surface of the liquid crystal display panel 159 is also likely to warp by being affected by the warp of the touch panel 179. Thus, the pooling phenomenon is not completely eliminated in the liquid crystal display device 189.

The present invention has been made to solve the above problems. An object of the present invention is to provide a display device where elimination of the pooling phenomenon and the narrowing of frame are both achieved simultaneously.

Solution to Problem

According to the present invention, a display device includes a touch panel and a display unit that responds to an input operation performed via the touch panel. Here, the display unit includes a display panel, a frame covered with the display panel, and a first case that holds the frame, and the first case includes a support portion that supports the touch panel, keeping the touch panel away from the frame.

With this arrangement, when touch input is performed on the touch panel, pressures applied via the touch panel is applied to the first case, not to the frame. Thus, the frame does not sag or warp, and thus the display panel which covers the frame does not receive pressure from the frame. As a result, no inconvenience such as wavy display surface of the display panel (a pooling phenomenon) arises attributable to the frame.

Moreover, since the frame does not receive pressure, it does not have to be excessively rigid, and if the frame is picture-frame shaped, each side of the picture-frame shape can be formed narrow, and further, thin. Thus, narrowing of frame is achieved and the pooling phenomenon is eliminated in such a display device.

Preferably, for the purpose of avoiding contact between the support portion of the first case and the frame, the frame includes a frame opening portion, and the support portion supports the touch panel through the frame opening portion.

Still preferably, a second case is disposed between the touch panel and the display panel, and the support portion of the first case supports the touch panel, keeping the touch panel away from the second case.

With this arrangement, when touch input is performed on the touch panel, pressure applied to the touch panel is transmitted to the first case via the support portion, not to the second case. Consequently, the pressure does not cause the second case to sag or warp, and thus no pressure is applied to the display panel from the second case placed over the display panel. As a result, the display device is free from inconveniences such as the display surface of the display panel becoming wavy.

Moreover, since the second case does not receive pressure, it does not have to be excessively rigid, and if the second case is picture-frame shaped, each side of the picture-frame shape can be formed narrow, and further, thin. Thus, narrowing of frame is achieved and the pooling phenomenon is eliminated in such a display device.

Preferably, for the purpose of avoiding contact between the support portion of the first case and the second case, the second case includes a case opening portion, and the support portion supports the touch panel through the case opening portion.

Advantageous Effects of Invention

According to the present invention, pressure applied via the touch panel is not transmitted to the frame which is covered with the display panel and thus faces the display panel. Thus, the frame does not suffer problems such as deformation, and does not come into contact with the display panel. Consequently, no problem (for example, the pooling phenomenon) occurs on the display surface of the display panel. Moreover, since no pressure is applied to the frame, the frame can be made thin and narrow, and thus the liquid crystal display device can be thin and compact.

DESCRIPTION OF EMBODIMENTS

Embodiment 1

Figure 1:
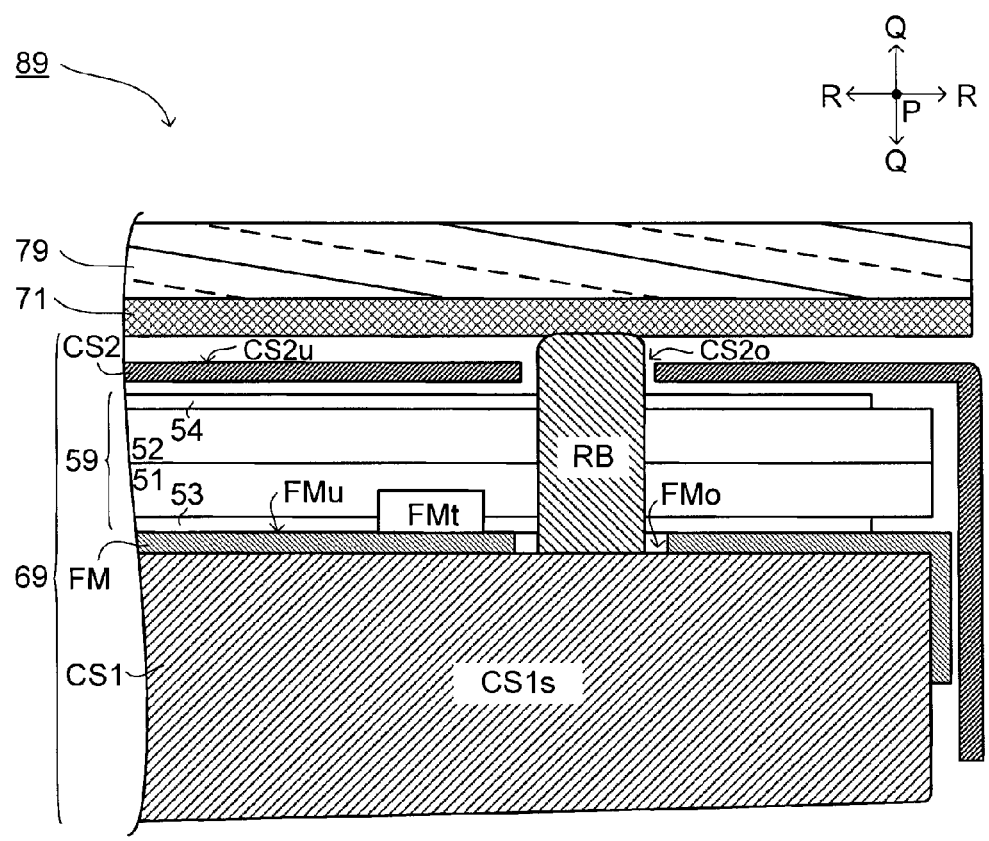
FIG. 1 A sectional view taken along line A-A' and viewed from the direction indicated by arrows in FIGS. 3 and 4.

Hereinafter, an embodiment of the present invention will be described based on the drawings. Hatching, reference signs for members and the like may sometimes be omitted in a drawing for ease of description, and in such a case, a different drawing is to be referred to. Reversely, views other than sectional views may be shown with hatching for the sake of convenience. A black dot in a drawing indicates a direction perpendicular to the sheet on which the drawing is drawn.

The following description will deal with a liquid crystal display device as an example of a display device, but this is not meant to limit the present invention. For example, the display device may be an organic EL (electro-luminescence) display or a plasma display.

Figure 3:
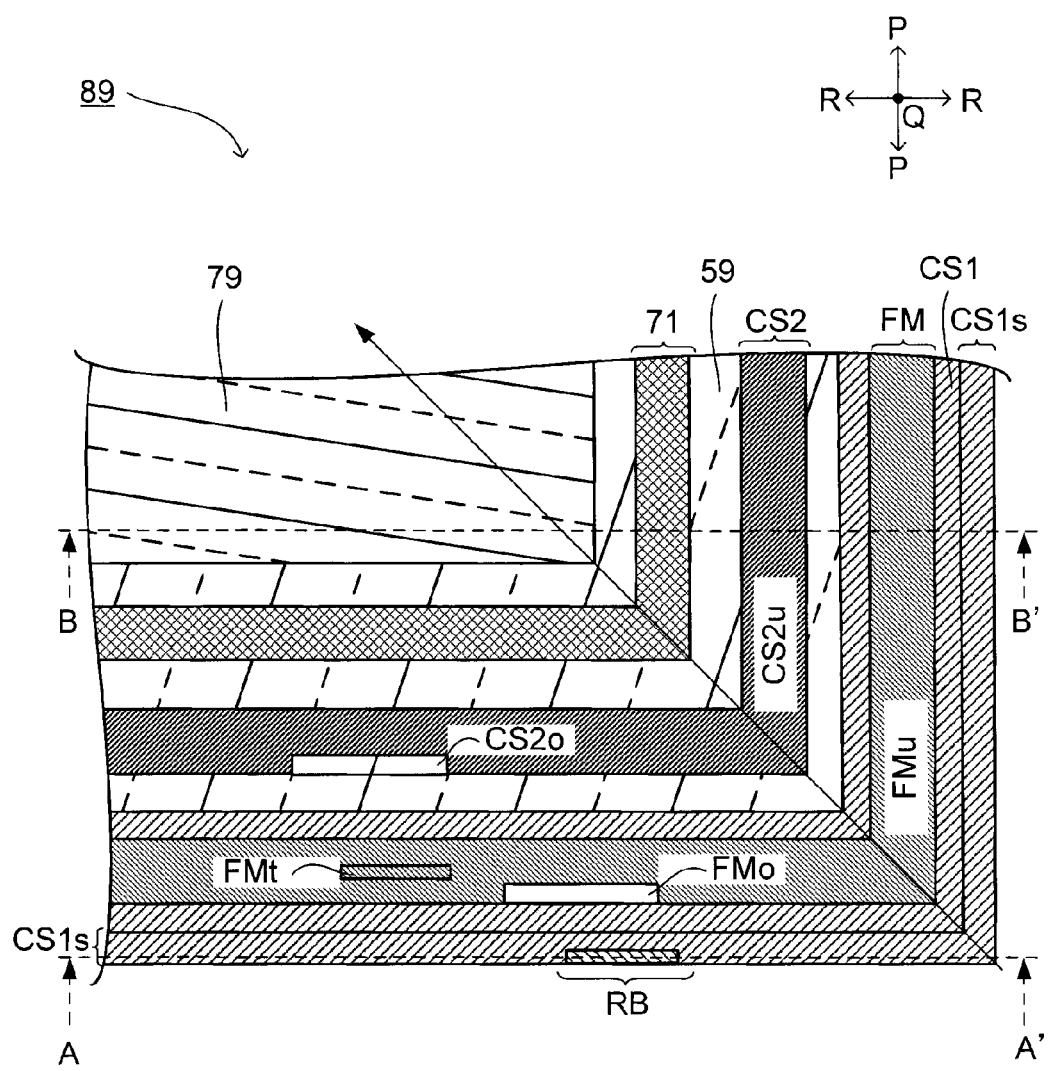
FIG. 3 An exploded plan view showing part of members included in a liquid crystal display device.
Figure 4:
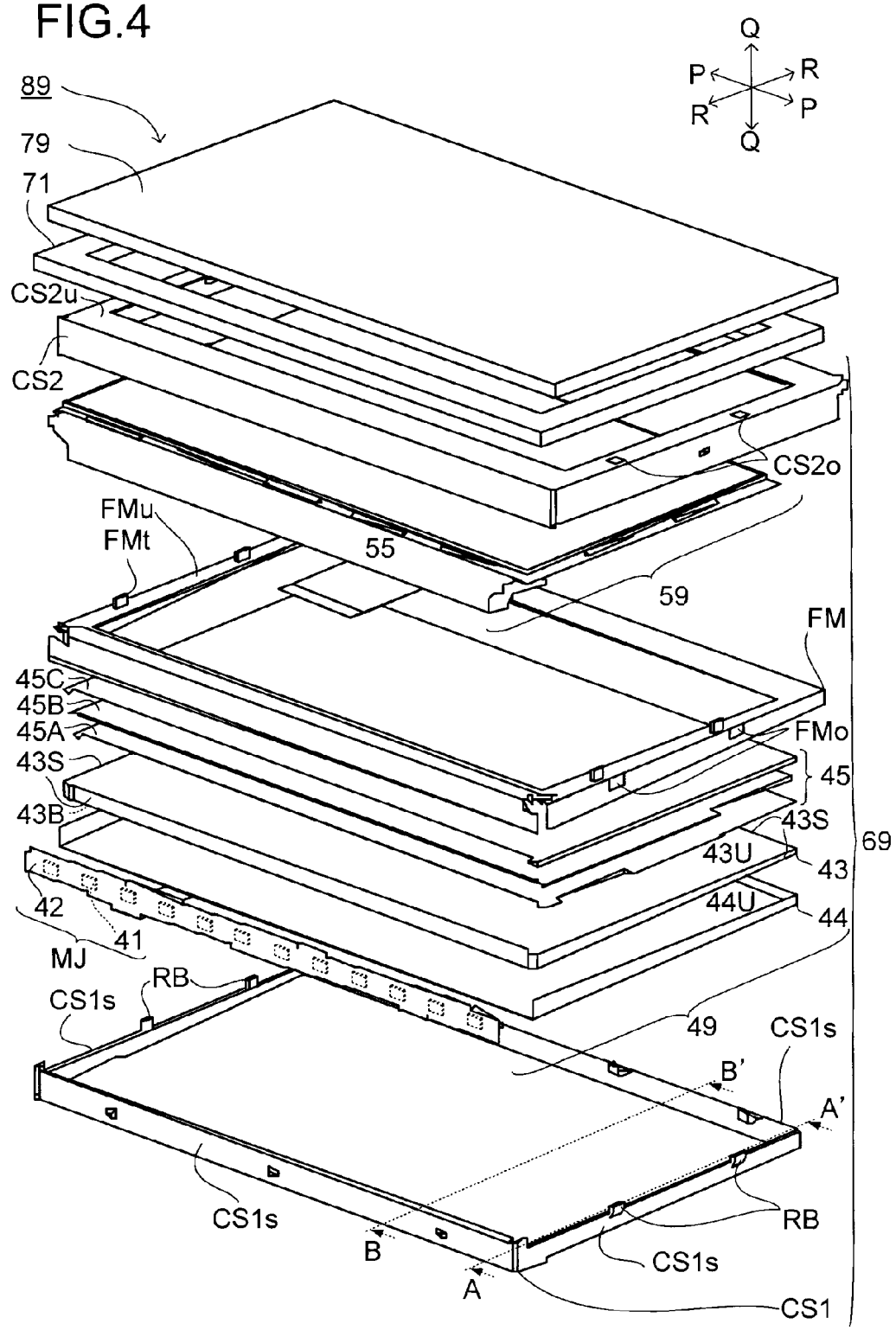
FIG. 4 An exploded perspective view showing a liquid crystal display device.
Figure 5:
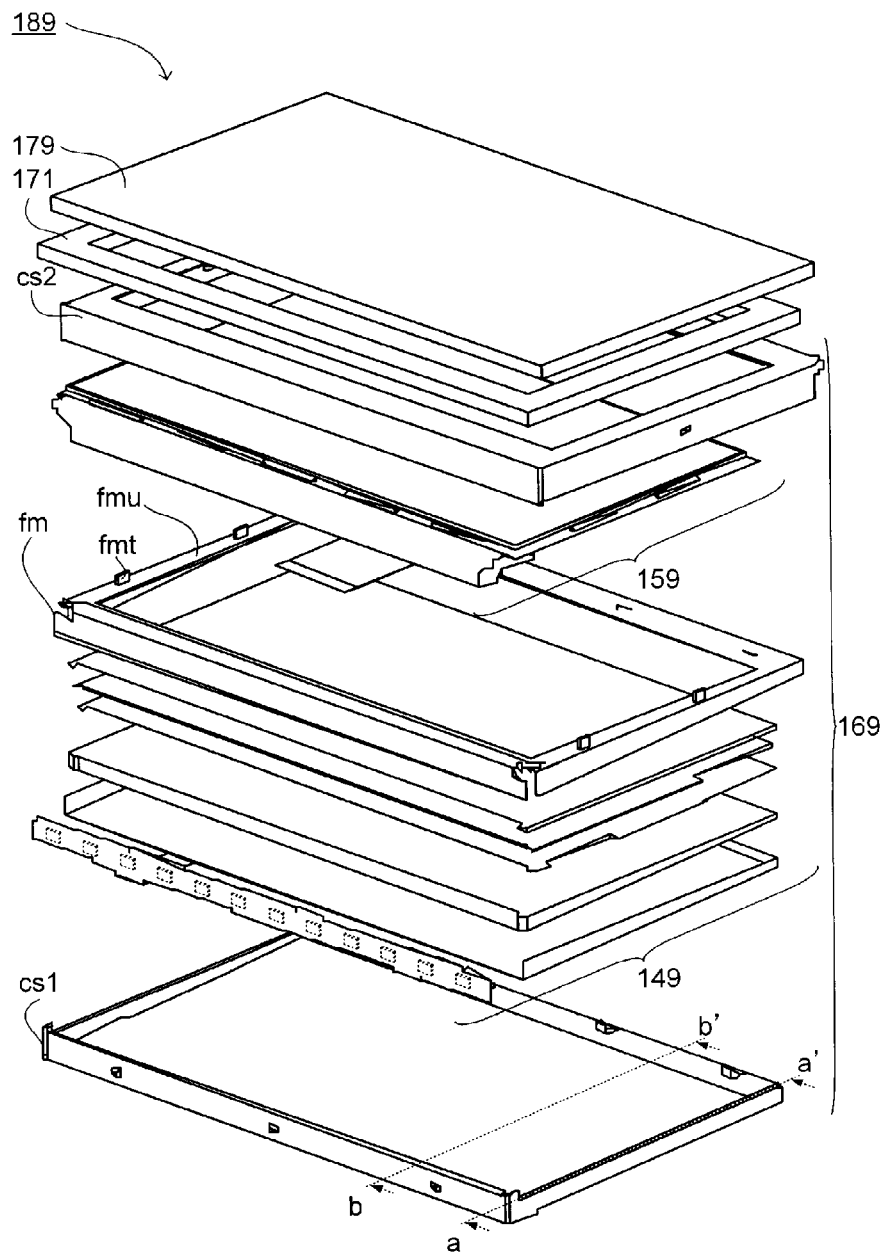
FIG. 5 An exploded perspective view showing a conventional liquid crystal display device.
Figure 6:
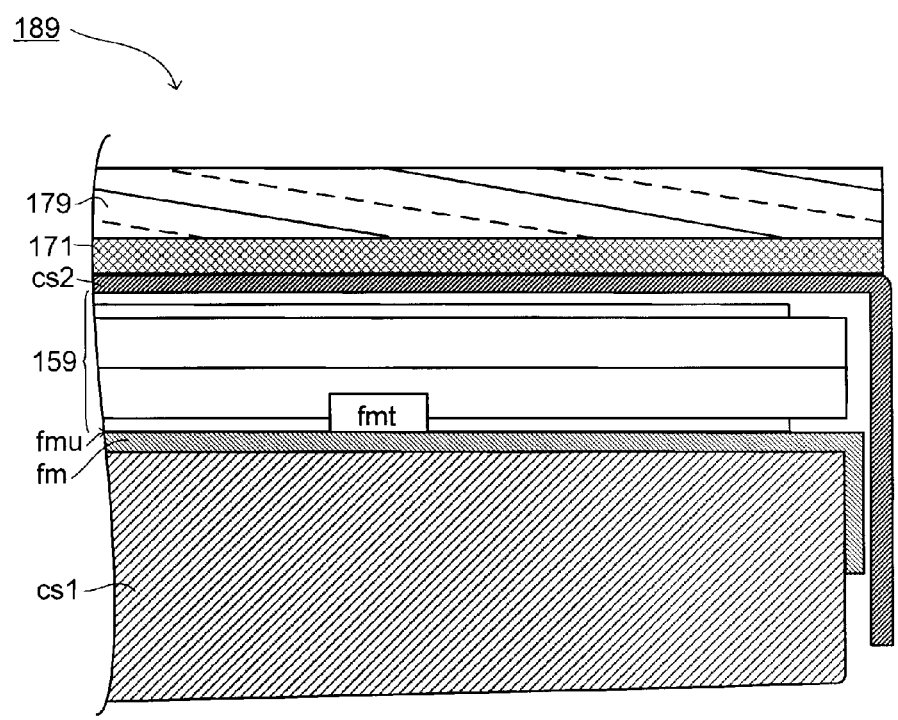
FIG. 6 A sectional view taken along line a-a' and viewed from the direction indicated by arrows in FIG. 5.
Figure 7:
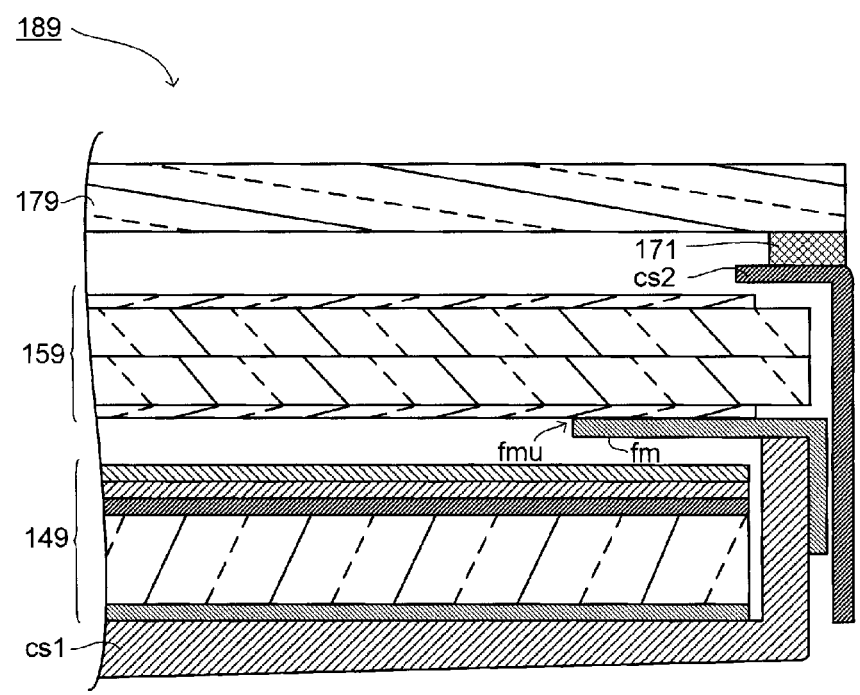
FIG. 7 A sectional view taken along line b-b' and viewed from the direction indicated by arrows in FIG. 5.
Figure 8:
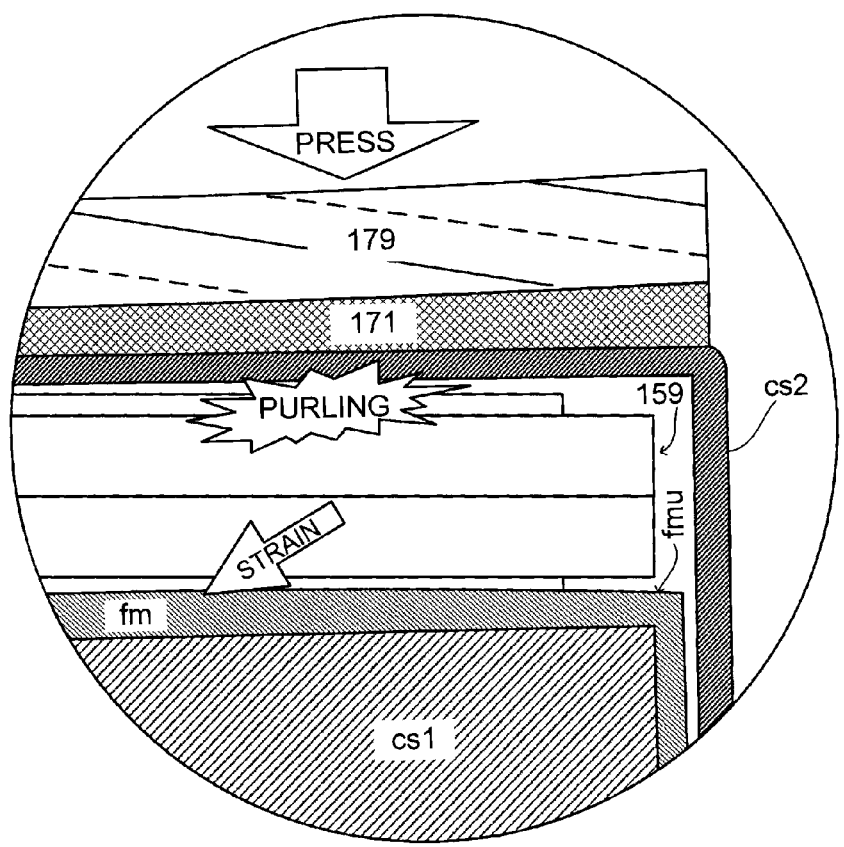
FIG. 8 An enlarged sectional view showing a problem that arises in a conventional liquid crystal display device.
Figure 9:
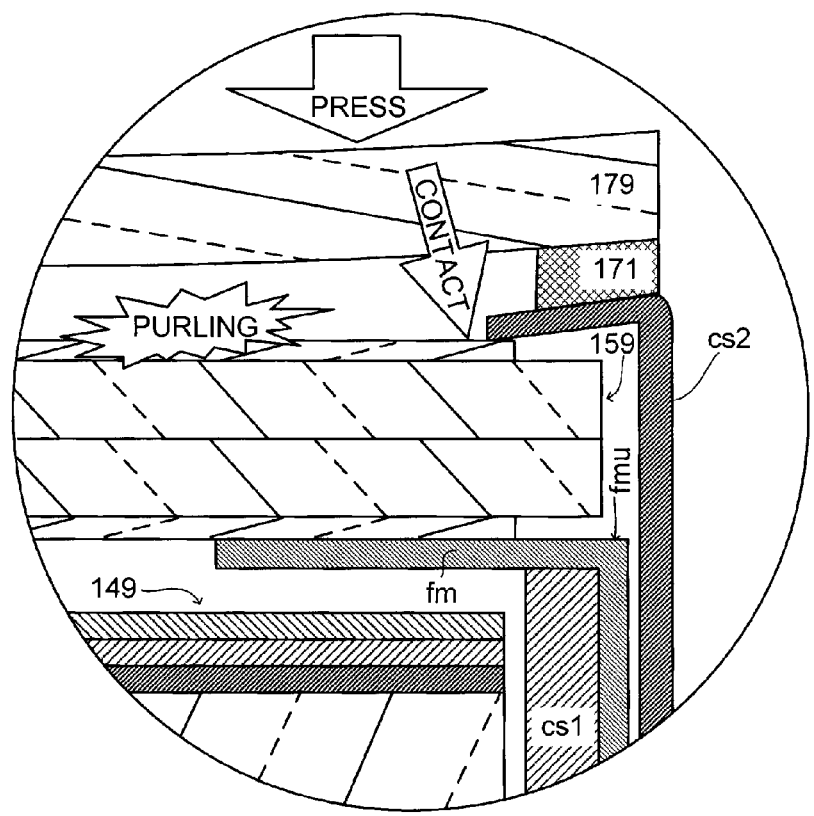
FIG. 9 An enlarged sectional view showing a problem arising in a conventional liquid crystal display device.
Figure 10:
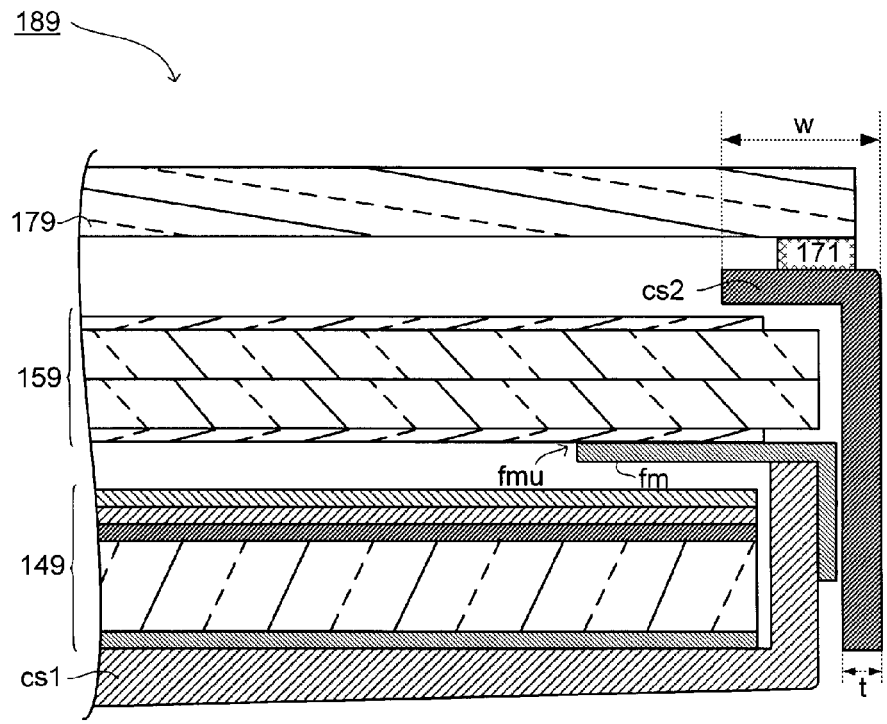
FIG. 10 A sectional view showing a pooling-proofed liquid crystal display device to which an anti-pooling measures are applied.
Figure 11:
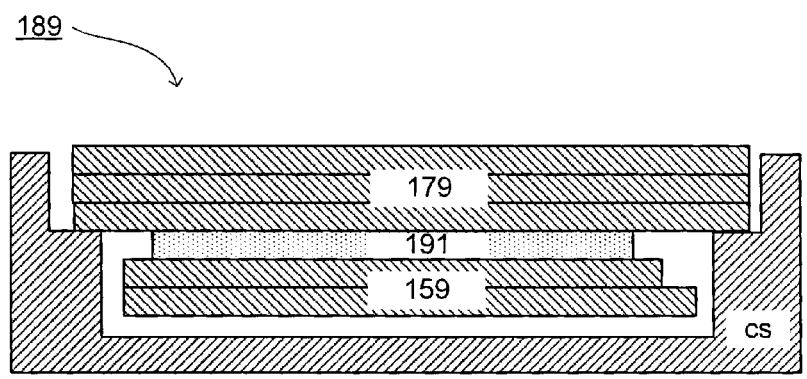
FIG. 11 A sectional view showing a conventional liquid crystal display device.

FIG. 4 is an exploded perspective view showing a liquid crystal display device 89 in an exploded manner. FIG. 3 is an exploded plan view showing part of members included in the liquid crystal display device 89 (for the sake of convenience, most part of a later-described backlight unit 49 is omitted). For the sake of convenience, FIG. 3 shows the members, which are stacked, in such a manner that they are displaced from each other in a direction indicated by the solid arrow (note that the closer to the tip of the arrow a member is illustrate, the upper in the stack of the members the member is located).

Figure 2:
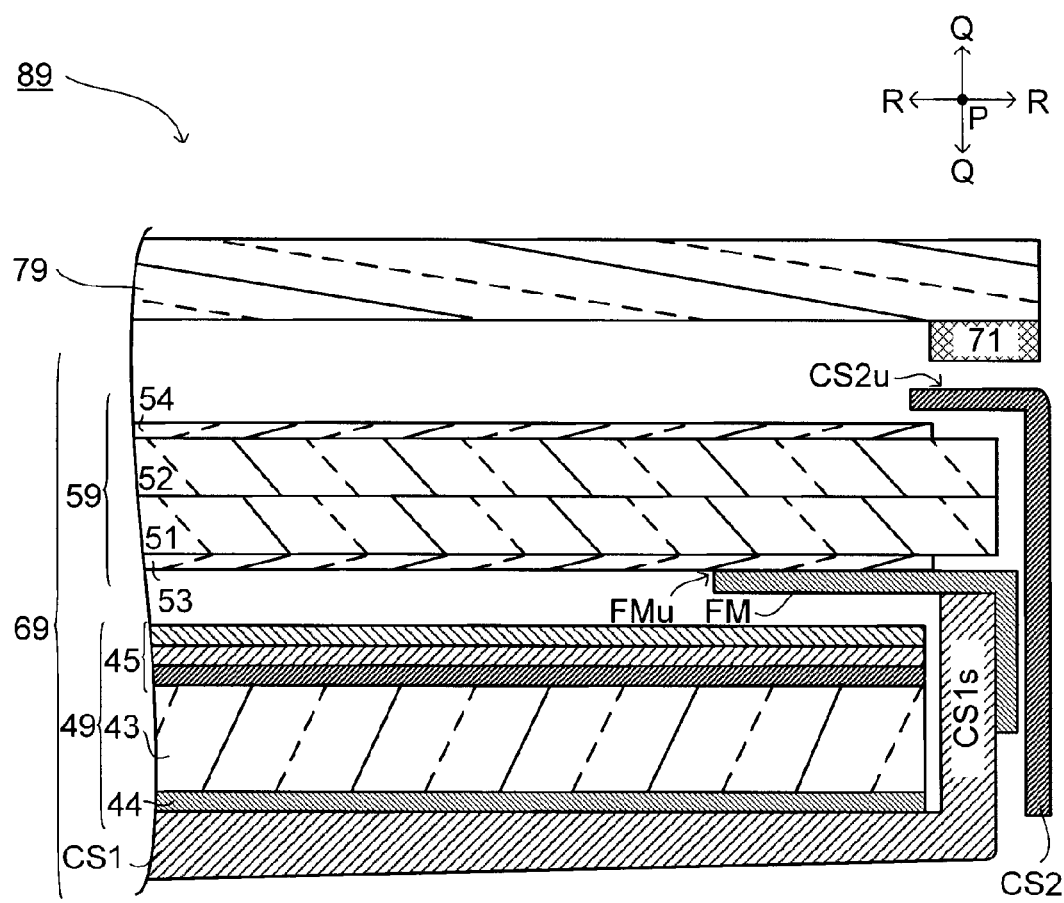
FIG. 2 A sectional view taken along line B-B' and viewed from the direction indicated by arrows in FIGS. 3 and 4.

FIG. 1 is a sectional view taken along line A-A' and viewed from a direction indicated by arrows in FIGS. 3 and 4 (here, any member without hatching is a member visible sideways). FIG. 2 is sectional view taken along line B-B' and viewed from a direction indicated by arrows in FIGS. 3 and 4.

As is clear from each of these figures, the liquid crystal display device 89 includes a display unit 69 and a touch panel 79 that covers the display unit 69.

First, the display unit 69 will be described. The display unit 69 includes a liquid crystal display panel 59, the backlight unit 49, and a case CS (a rear case CS1 and a front case CS2) that holds the liquid crystal display panel 59 and the backlight unit 49 therein.

As shown in FIGS. 1 and 2, for example, the liquid crystal display panel (a display panel) 59 includes an active matrix substrate 51, a counter substrate 52, polarization films 53 and 54, and an FPC (flexible printed circuits) board 55 (see FIG. 4) for the panel.

Specifically, the liquid crystal display panel 59 is formed by bonding the active matrix substrate 51 including switching devices such as TFTs (thin film transistors) and the counter substrate 52 facing the active matrix substrate 51 to each other with a seal member (not shown). And liquid crystal (not shown) is sealed in a space between the substrates 51 and 52.

The polarization film 53 is attached to the active matrix substrate 51 while the polarization film 54 is attached to the counter substrate 52, such that the polarization films 53 and 54 hold the active matrix substrate 51 and the counter substrate 52 therebetween.

The FPC board (a first circuit board) 55 for the liquid crystal display panel 59 is a flexible circuit board including a current supply conductor (not shown). The FPC board 55 for the panel is electrically and physically connected to the active matrix substrate 51.

The back light unit 49 supplies light to the liquid crystal display panel 59, which does not emit light by itself. Thus, the liquid crystal display panel 59 exerts its display function by receiving light (backlight light) from the backlight unit 49. Consequently, the display quality of the liquid crystal display panel 59 will be improved by uniform irradiation of the entire surface of the liquid crystal display panel 59 with the light from the backlight unit 49.

As shown in FIG. 4, for example, the backlight unit 49 includes an LED module MJ, a light guide plate 43, a reflecting sheet 44, an optical-sheet group 45 (a diffusion sheet 45A, lens sheets 45B and 45C), and an internal frame FM.

The LED module MJ is a light emitting module and includes an LED (light emitting diode) 41 and a mount substrate 42 on which the LED 41 is mounted.

The LED 41 is mounted on an electrode (unillustrated) formed on a mounting surface of the mount substrate 42, and thereby receives electric current and emits light. To acquire sufficient amount of light, it is preferable that a plurality of LEDs (point light sources) 41 are mounted as the LED 41 on the mount substrate 42. In the drawings, however, for the sake of convenience, merely part of the LEDs 41 are illustrated (hereinafter, the direction in which the LEDs 41 are aligned will be referred to as an alignment direction P).

The light guide plate 43 is a plate-like member that has side surfaces 43S and a top and bottom surfaces 43U and 43B that are positioned so as to hold the side surfaces 43S therebetween. One of the side surfaces 43S is a light receiving surface which faces light emitting surfaces of the LEDs 41 and thereby receive light from the LEDs 41. The received light is repeatedly reflected inside the light guide plate 43, and outputted to the outside through the top surface 43U as planar light.

The reflecting sheet 44 is located to be covered with the light guide plate 43. One surface of the reflecting sheet 44 that faces the bottom surface 43B of the light guide plate 43 functions as a reflecting surface 44U. Thus, the reflecting surface 44U reflects light, such as light from the LEDs 41 and light transmitted through the light guide plate 43, back to the light guide plate 43 (specifically, through the bottom surface 43B of the light guide plate 43 to the light guide plate 43) without allowing leakage of light.

The optical-sheet group 45 includes the single diffusion sheet 45A and the two lens sheets 45B and 45C. Specifically, it can be said that a plurality of sheets, namely, the diffusion sheet 45A, the lens sheet 45B, and the lens sheet 45C that are stacked in this order form the optical-sheet group 45.

The diffusion sheet 45A is located to cover the top surface 43U of the light guide plate 43, and the diffusion sheet 45A diffuses the planar light from the light guide plate 43 to thereby deliver light all over the liquid crystal display panel 59.

The lens sheets 45B and 45C are each an optical sheet that has a surface including, for example, a prism structure and deflects the radiation property of light, and so positioned as to cover the diffusion sheet 45A (specifically, the lens sheet 45B covers the diffusion sheet 45A, and the lens sheet 45B is covered with the lens sheet 45C). With this arrangement, the lens sheets 45B and 45C collect light coming from the diffusion sheet 45A to thereby achieve improved brightness. Incidentally, a direction in which light collected by the lens sheet 45B is dispersed and a direction in which light collected by the lens sheet 45C is dispersed cross each other.

The internal frame (a frame) FM is a picture-frame shaped member, and holds the above-described various members by surrounding them (the point is that the internal frame FM serves as the framework of the backlight unit 49). Specifically, the internal frame FM holds the reflecting sheet 44, the light guide plate 43, and the optical-sheet group 45 stacked in this order (incidentally, the direction in which these members are stacked will be referred to as a stacking direction Q, and a direction that crosses (for example, at right angles to each other) the alignment direction P and the stacking direction Q will be referred to as a crossing direction R).

Further, the internal frame FM supports the liquid crystal display panel 59 by part of a front surface thereof. Specifically, a support surface FMu, which is part of the front surface of the internal frame FM that faces the liquid crystal display panel 59, supports the periphery of the liquid crystal display panel 59 (it is desirable that an unillustrated double-stick tape is disposed between the liquid crystal display panel 59 and the support surface FMu).

Protrusions FMt are formed on the support surface FMu of the internal frame FM, and the position of the liquid crystal display panel 59 is determined with respect to the internal frame FM by sides of the protrusions FMt coming into contact with sides of the liquid crystal display panel 59 (that is, the protrusions FMt function as positioning members for positioning the liquid crystal display panel 59).

In the above-described backlight unit 49, light from the LEDs 41 is outputted by the light guide plate 43 as planar light, and the planar light travels through the optical-sheet group 45 to be thereby outputted as backlight light having improved emission brightness, and reaches the liquid crystal display panel 59.

Next, the case CS (CS1 and CS2) will be described. The case CS is divided into two parts, namely, a rear case (a first case) CS1 which is covered with the backlight unit 49 and a front case (a second case) CS2 which covers the liquid crystal display panel 59, the liquid crystal display panel 59 and the backlight unit 49 being stacked together.

The rear case CS1 is a box shaped member, and accommodates various members such as the reflecting sheet 44, the light guide plate 43, and the optical-sheet group 45 by holding the internal frame FM (that is, the rear case CS1 accommodate the backlight unit 49).

The front case CS2 is a picture-frame shaped member; it is placed over the liquid crystal display panel 59 which is disposed on the internal frame FM of the backlight unit 49, such that the display screen of the liquid crystal display panel 59 is exposed (in short, the front case CS2 covers the periphery of the liquid crystal display panel 59, leaving the other part of the liquid crystal display panel 59 exposed).

The front case CS2 and the rear case CS1 are fixed to each other, and thereby, the case CS (CS1 and CS2) holds the liquid crystal display panel 59 and the backlight unit 49 therein. Inside the case CS (CS1 and CS2), the backlight unit 49 is fixed to the rear case CS1 via the internal frame FM.

The display unit 69 having the case CS (CS1 and CS2) as its outer package supports the touch panel 79 via the cushion sheet 71 which is picture-frame shaped like the front case CS2. Specifically, a support surface CS2$u$, which is part of a front surface of the front case CS2 and faces the touch panel 79, supports the periphery of the touch panel 79 via the cushion sheet 71.

The touch panel 79, when it is pressed down (for touch input) with, for example, a finger tip of a pen, generates a signal according to which position therein is pressed down. The signal is generated according to variation in amount of charge displacement on the touch panel surface.

The touch panel 79 sends the generated signal to a touch position detecting circuit (not shown), and the touch position detecting circuit generates positional data of the touch panel surface from the received signal, and sends the positional data to a control portion (not shown) that performs overall control of the liquid crystal display device 89. The control portion recognizes what is instructed by the touch input based on the positional data, and, for example, switches the display screen of the liquid crystal display panel 59 (that is, the display unit 69 including the liquid crystal display panel 59 and the backlight unit 49 responds to the input operation performed on the touch panel 79).

If the liquid crystal display device 89 is incorporated in an apparatus such as a navigation system, the control portion controls navigation contents, or controls a music playing-back device included in the navigation system (here, the control portion may be located outside the liquid crystal display device 89 but inside the navigation system).

Now, a description will be given of a member that receives pressure generated by touch input performed on the touch panel 79 (that is, a member that supports the touch panel 79). The member is a rib (a support portion) RB formed on the rear case CS1. The rib RB is formed on a side wall CS1s of the box-shaped rear case CS1.

For example, as shown in FIG. 4, the rib RB is formed on each of two side walls CS1s (each of opposing side walls CS1s) extending along the short side direction of the rear case CS1. In FIG. 4, two ribs RB are formed on one of the side walls CS and two ribs RB are formed on the other one of the side walls CS1s; however, there is no particular limitation to the number and the positions of the ribs RB.

In each of the side walls CS1s, these ribs RB protrude from an edge of the side wall CS1s along a direction (same direction as the stacking direction Q) in which the side wall CS1s rises. In particular, the ribs RB protrude higher than an edge of the side wall CS1s that faces the liquid crystal display panel 59.

Thus, if the internal frame FM of the backlight unit 49 is placed over the rear case CS1 as shown in FIGS. 1 and 2, the ribs RB may come into contact with the internal frame FM. However, the internal frame FM includes frame apertures (frame opening portions) FMo for placing the ribs RB therethrough. Thus, as shown in FIG. 1, the ribs RB protrude to the liquid crystal display panel 59 side through the frame apertures FMo, to thereby avoid contact with the internal frame FM.

Furthermore, the ribs RB has a length that is greater in dimension than a thickness of the liquid crystal display panel 59. Thus, if the front case CS2 is placed over the liquid crystal display panel 59 as shown in FIGS. 1 and 2, the ribs RB may come into contact with the front case CS2. However, the front case CS2 includes case apertures (case opening portions) CS2o for placing the ribs RB therethrough. Thus, the ribs RB protrude to the touch panel 79 side through the case apertures, to thereby avoid contact with the front case CS2.

As a result, tips of the ribs RB are closer to the touch panel 79 than the support surface CS2u of the front case CS2 is. Thus, the ribs RB support the touch panel 79 via the cushion sheet 71. That is, in a case where, in the liquid crystal display device 89 incorporating the touch panel 79 and the display unit 69, the display unit 69 includes the rear case CS1 that holds the liquid crystal display panel 59, the internal frame FM that is covered with the liquid crystal display panel 59, and the rear case CS1 that holds the internal frame FM, the ribs RB of the rear case CS1 support the touch panel 79, keeping the touch panel 79 away from the internal frame FM.

With this arrangement, pressure applied via the touch panel 79 when touch input is performed thereon is transmitted to the rear case CS1 via the ribs RB, not to the internal frame FM. Thus, the internal frame, which does not receive the pressure, does not sag or warp (that is, the internal frame is not deformed). Hence, no pressure is transmitted from the internal frame FM to the liquid crystal display panel 59 that covers the internal frame FM. This eliminates inconveniences such as a wavy display surface of the liquid crystal display panel 59 (the pooling phenomenon) (note that, since the pooling phenomenon does not occur, the image quality of the liquid crystal display device 89 is not degraded).

Moreover, since no pressure is applied to the internal frame FM, there is no need of excessively increasing the rigidity of the picture-frame shaped internal frame FM by, for example, increasing the width and thickness of the sides thereof. This helps make the internal frame FM thin and narrow-framed (that is, helps reduce a width of the support surface FMu forming side portions of the internal frame FM), and thus helps make the liquid crystal display device 89 thin and compact.

As shown in FIG. 1, the ribs RB are out of contact with the internal frame FM by being placed through the frame apertures FMo to protrude to the liquid crystal display panel 59 side than the support surface FMu of the internal frame FM.

With this arrangement, since the ribs RB are fitted into the frame apertures FMo, even if excessive vibration is applied to the liquid crystal display device 89, the internal frame FM does not come off from the rear case CS1, and thus the liquid crystal display panel 59 does not come off from the rear case CS1, either (here, the internal frame FM and the liquid crystal display panel 59 are coupled to each other by an unillustrated double-stick tape). Thus, in the display unit 69, and thus in the liquid crystal display device 89, the liquid crystal display panel 59 is stably positioned.

Moreover, in the liquid crystal display device 89, the picture-frame shaped front case CS2 is fixed to the rear case CS1 that accommodates the backlight unit 49 therein, and is also placed over the liquid crystal display panel 59 supported by the internal frame FM of the backlight unit 49. That is, the front case CS2 is disposed between the touch panel 79 and the liquid crystal display panel 59. Thus, the ribs RB of the rear case CS1 supports the touch panel 79, keeping the touch panel 79 away from the front case CS2.

With this arrangement, pressure applied via the touch panel 79 when touch input is performed thereon is transmitted to the rear case CS1 via the ribs RB, not to the front case CS2. Thus, the front case CS2, which does not receive the pressure, does not sag or warp (that is, the front case CS2 is not deformed). Hence, no pressure is transmitted from the front case CS2 to the liquid crystal display panel 59 that is covered with the front case CS2 (for example, the front case CS2 is not so deformed as to come into contact with the liquid crystal display panel 59). As a result, problems such as a wavy display surface of the liquid crystal display panel 59 (the pooling phenomenon) do not arise.

Moreover, since no pressure is applied to the front case CS2, there is no need of excessively increasing the rigidity of the picture-frame shaped front case CS2 by, for example, increasing the width and thickness of the sides thereof. This helps make the front case CS2 thin and narrow-framed (that is, helps reduce a width of the support surface CS2u that forms side portions of the front case CS2), and thus helps make the liquid crystal display device 89 thin and compact.

As shown in FIG. 1, the ribs RB are out of contact with the internal frame FM by being placed through the case apertures CS2o to protrude to the liquid crystal display panel 59 side than the support surface CS2u of the front case CS2.

With this arrangement, the ribs RB are fitted into the case apertures CS2o, and thus, even if excessive vibration is applied to the liquid crystal display device 89, the front case CS2 is securely prevented from coming off from the rear case CS1 (that is, the front case CS2 is prevented from coming off from the rear case CS1 by increased number of means). This contributes to achieving a stronger outer package of the display unit 69 (stronger coupling between the cases CS1 and CS2).

Other Embodiments

It should be understood that the embodiments specifically described above are not meant to limit the present invention, and that many variations and modifications can be made within the spirit of the present invention.

For example, according to the above descriptions, as shown in FIG. 4, the ribs RB are formed on the two short ones of the side walls CS1s forming the frame shape of the rear case CS1. This, however, is not meant as a limitation; for example, the ribs RB may be formed on the two long ones of the side walls CS1s forming the frame shape.

Here, it is preferable that, as shown in FIG. 4, the ribs RB be formed on one and the other of a pair of opposing side walls CS1s such that the ribs RB also each face a corresponding one of the other ribs RB, in the same manner that the opposing side walls CS1s face each other.

This is because, with this arrangement, pressure applied to the touch panel 79 when touch input is performed thereon is effectively dispersed (that is, the touch panel 79 is stably supported by the ribs RB). Furthermore, to disperse the pressure applied to the touch panel 79 even more effectively, the ribs RB may be formed on all the side walls CS of the rear case CS1.

In the internal frame FM and the front case CS2, the opening portions formed for the ribs RB to pass therethrough may be formed as apertures like the frame apertures FMo and the case apertures CS2o, but this is not meant to limit the present invention. For example, the opening portions formed in the internal frame FM and the front case CS2 may be formed as cuts (the frame opening portion, the case opening portion). The point is that the ribs RB are securely kept out of contact with the internal frame FM and the front case CS2 to thereby prevent pressure applied via the touch panel 79 from being transmitted to the internal frame FM and the front case CS2.

The ribs RB do not need to be placed through the opening portions (the frame apertures FMo and the case apertures CS2o) formed in the internal frame FM and the front case CS2. For example, it can be said that the opening portions are not necessary if the ribs RB are formed on outer side surfaces of the side walls CS1s such that they are allowed to be in contact (for example, a direct contact or an indirect contact via the cushion sheet 72) with the touch panel 79 without being in contact with the internal frame FM and the front case CS2.

LIST OF REFERENCE SYMBOLS

RB rib [support portion]
CS case
CS1 rear case [first case]
CS1s side wall of rear case
CS2 front case [second case]
CS2u support surface of front case
CS2o case aperture [case opening portion] of front case
FM internal frame [frame] of backlight unit
FMu support surface of the internal frame
FMo frame aperture [frame opening portion] of internal frame
FMt protrusion
49 backlight unit
59 liquid crystal display panel [display panel]
69 display unit
71 cushion sheet
79 touch panel
89 liquid crystal display device [display device]

The invention claimed is:

1. A display device, comprising
a touch panel; and
a display unit that responds to an input operation performed via the touch panel, wherein
the display unit includes a display panel, a frame covered with the display panel, and a first case that holds the frame;
the first case includes a support portion that supports the touch panel so as to keep the touch panel away from the frame;
the frame includes a frame opening portion;
the support portion supports the touch panel through the frame opening portion;
a second case is disposed between the touch panel and the display panel;
the support portion of the first case supports the touch panel from under a bottom surface of the touch panel so as to keep the touch panel away from the second case;
the second case includes a case opening portion; and
the support portion supports the touch panel from under the bottom surface of the touch panel through the case opening portion.

* * * * *